(12) United States Patent
Kanerva et al.

(10) Patent No.: US 6,240,076 B1
(45) Date of Patent: May 29, 2001

(54) ASYMMETRIC HIGH-SPEED DATA TRANSMISSION APPARATUS AND METHOD IN A MOBILE COMMUNICATIONS NETWORK

(75) Inventors: Mikko Kanerva, Helsinki; Jari Hämäläinen, Tampere; Harri Jokinen, Hiisi, all of (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 08/945,387
(22) PCT Filed: Apr. 24, 1996
(86) PCT No.: PCT/FI96/00225
§ 371 Date: Feb. 9, 1998
§ 102(e) Date: Feb. 9, 1998
(87) PCT Pub. No.: WO96/34468
PCT Pub. Date: Oct. 31, 1996

(30) Foreign Application Priority Data

Apr. 25, 1995 (FI) .......................................... 951971

(51) Int. Cl.$^7$ ...................................................... H04J 3/16
(52) U.S. Cl. ............................ 370/330; 390/345; 390/468
(58) Field of Search .................................... 370/330, 336, 370/337, 345, 347, 348, 468

(56) References Cited

FOREIGN PATENT DOCUMENTS

| | | |
|---|---|---|
| 399 612 | 11/1990 | (EP) . |
| 644 702 | 3/1995 | (EP) . |
| 654 916 | 5/1995 | (EP) . |
| 671 824 | 9/1995 | (EP) . |
| 681 406 | 11/1995 | (EP) . |
| 687 084 | 12/1995 | (EP) . |
| 2 232 562 | 12/1990 | (GB) . |
| 90/08434 | 7/1990 | (WO) . |
| 96/10305 | 4/1996 | (WO) . |
| WO 96/19086 | 6/1996 | (WO) . |

*Primary Examiner*—Melvin Marcelo
(74) *Attorney, Agent, or Firm*—Pillsbury Winthrop LLP

(57) ABSTRACT

A mobile communications system and method for use in a high-speed data transmission between a mobile station and a mobile communications network in the mobile communications system based on time division multiple access (TDMA). The mobile communications system is arranged to use a different frequency for a transmitting direction and a receiving direction. The mobile communications system includes a time-slot allocating mechanism arranged to allocate at least two time slots in at least one of the transmitting and the receiving direction for data transmission; a time-slot employing mechanism arranged to employ time-slots asymmetrically so that in the transmitting direction and in the receiving direction a number of the time-slots corresponds to a currently required data transmission rate in each respective direction, the time-slot employing mechanism further arranged to keep allocated ones of the time-slots that are not used for data transmission; and a time-slot selecting mechanism arranged to select ones of the time-slots used for the data transmission in each direction such that even at a maximum timing advance.

40 Claims, 3 Drawing Sheets

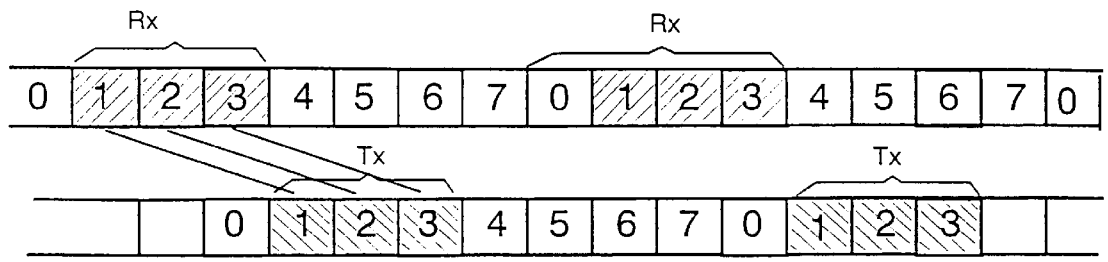
Fig. 5
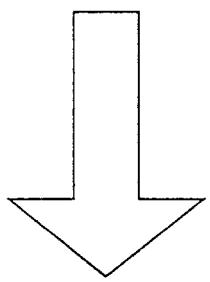
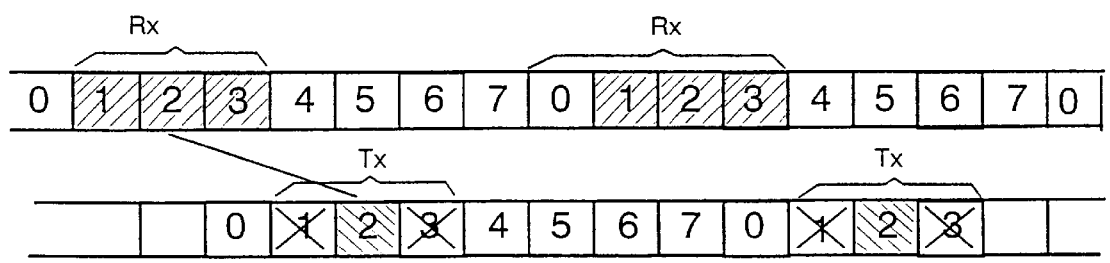
Fig. 6
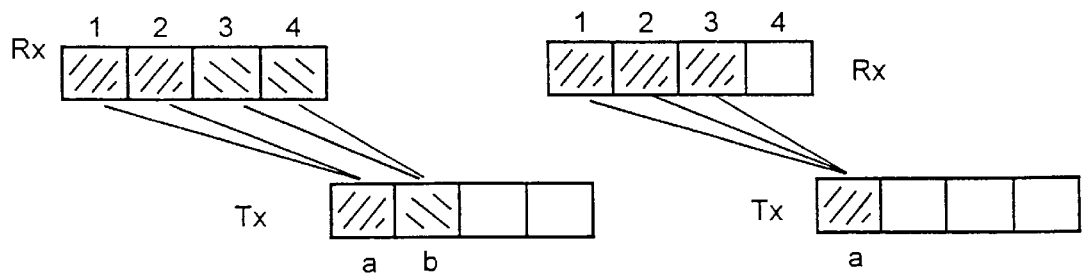
Fig. 7 　　　　　　　　　　　　Fig. 8

ASYMMETRIC HIGH-SPEED DATA TRANSMISSION APPARATUS AND METHOD IN A MOBILE COMMUNICATIONS NETWORK

The present invention relates to a method for transmitting data over the radio path in a mobile communications system based on time division multiple access (TDMA), in which system several time-slots of a frame may be allocated to a mobile station for data transmission.

British Patent Application No. GB-2,232,562, applied by Philips, discloses method for transmitting data over a time-division duplex channel. In accordance with the proposed method, one or more channels are allocated for data transmission. Each channel consists of a pair of time-slots. When it is detected that data transmission is or will be asymmetric, the unused time-slots in the other direction are released, and they may be re-allocated for other purposes.

Figure 1:
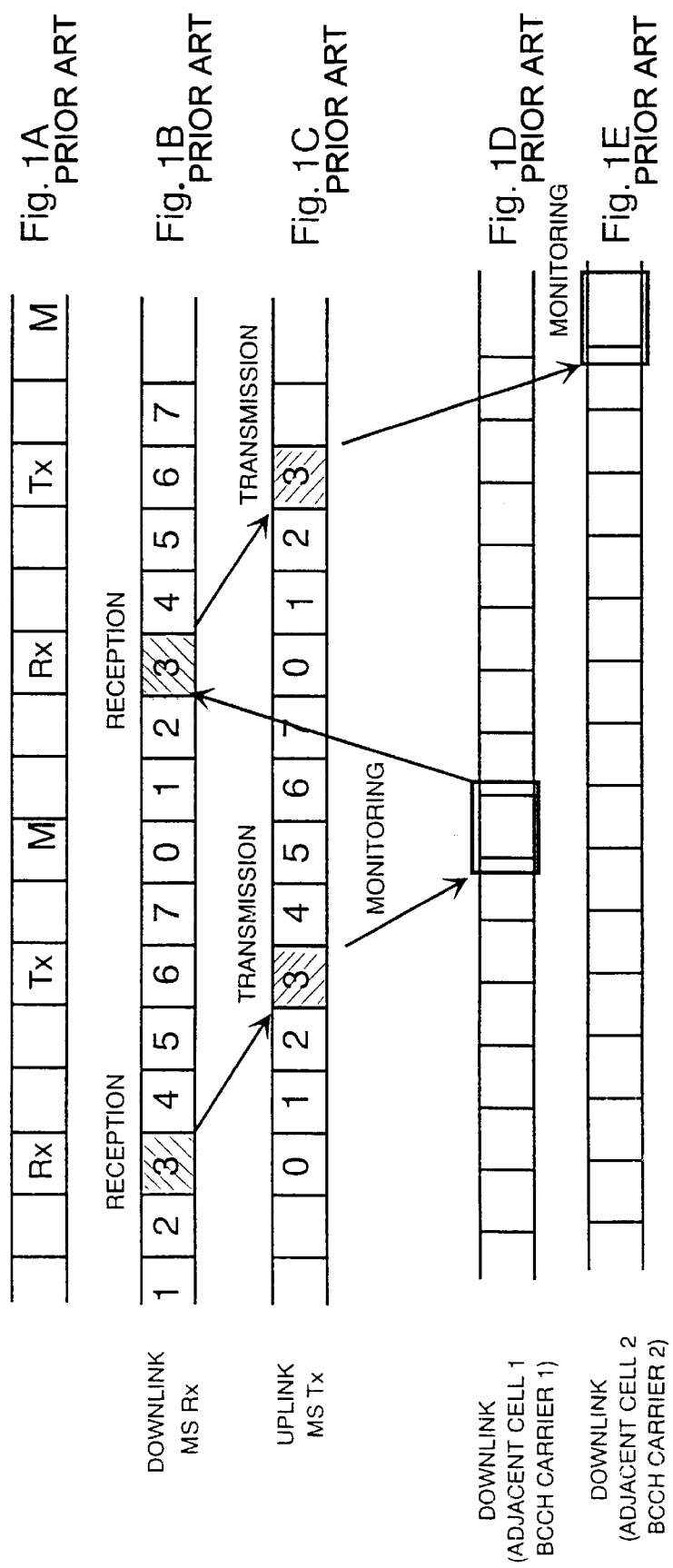

In the GSM system (Groupe Speciale Mobile) one TDMA frame is 4.615 ms in length, and consists of eight time-slots, which are numbered from zero to seven. The number of the time-slot is marked with an abbreviation TN (Time Slot Number). A full rate traffic channel TCH/F intended for transmitting speech and data consists of time-slots from successive frames, having the same time-slot number, so that from the point of view of the network, it is possible to form eight traffic channels on one carrier wave. The traffic in the direction from a mobile station to a base station (uplink) and the traffic in the direction from the base station to the mobile station (downlink) is arranged so that reception takes place in the base station three bursts later than transmission. Thus, the time-slot number TN of the time-slot in the transmission frame and that TN of the time-slot in the reception frame are identical. Correspondingly, in the mobile station, transmission takes place some three burst periods later than reception. These events are illustrated from the point of view of the mobile station in FIGS. 1A–1E. FIG. 1A shows successive time-slots of a mobile station located near a base station. Rx represents the reception time-slot, TX represents the transmission time-slot, and M stands for monitoring of adjacent cells. Transmission, reception and monitoring take place on different frequencies. FIG. 1B shows the time-slots of the reception frequency of the mobile station, and FIG. 1C shows the time-slots of the transmission frequency of the mobile station. The transmission and reception time-slots are marked with diagonal lines. During the time between transmission and reception the mobile station monitors the BCCH carrier waves of the adjacent cells. FIG. 1D shows the time-slots of the BCCH carrier wave of an adjacent cell, and FIG. 1E the time-slots of the BCCH carrier wave of a second adjacent cell. The-arrows combining the time-slots in the Figures illustrate the frequency changes that must be carried out by the radio part of the mobile station between reception, transmission and monitoring.

Transmission takes place in the transmission time-slot in form of a burst. A standard burst consist of two modulated 58-bit sequences with a 26-bit training sequence between them. At the beginning and at the end of the burst there are three tail bits. In order that the successive received bursts would not overlap, there is a guard-time at the end of each burst. The actual duration of the guard-time depends on the envelope of the transmission burst, but the usual duration of the guard-time is in the order of 30 microseconds. The guard-time is required as the mobile stations transmitting on the same radio carrier wave are within a random distance from the base station, and the propagation time of the radio waves from the base station to the mobile station thus varies from time-slot to time-slot. Therefore, the duration of the bursts transmitted in the time-slots must be slightly shorter than the time-slot in order to avoid overlapping of the bursts transmitted in adjacent time-slots during the reception at the base station. In order that the guard-time would be as short as possible and the mobile station could still be remote from the base station, the propagation delay of the transmission of a mobile station located remote from the base station must be compensated. Therefore the system is arranged to be such that the base station adjusts the transmission time of each mobile station dynamically on the basis of the bursts received from them. The base station provides the mobile station with a so-called timing advance TA, according to which the mobile station adjusts the starting moment of its transmission. Thus, in a mobile station located remote from the base station the time between reception and transmission is remarkably shorter than in a mobile station located near the base station.

In accordance to what has been stated above and FIGS. 1B–1C, the GSM system is optimized to use as a traffic channel a pair consisting of one time-slot of successive downlink frames and a corresponding time-slot of successive uplink frames. Thus, it is possible to employ in the mobile station just a simple radio part, which synthesizes the different frequencies for reception, transmission and listening to the adjacent cells. In order that the frequency synthesizer would have sufficient time to tune in and settle on a new frequency in order to carry out the required changes of frequency, the transmission of the mobile station is determined to take place in the way described above with a delay with respect to reception. Correspondingly, a sufficient time still remains between transmission and reception for monitoring the frequencies of the adjacent cells.

The prior art traffic channel arrangement described above is attended by the drawback that the use of only one traffic channel time-slot from each frame allows a very small capacity, e.g. in the GSM system the maximum data transfer rate on one traffic channel is 9.6 kbit/s. In the last few years there has been a remarkable increase in the demand for high-speed data services in the mobile communications networks. For making use of ISDN (Integrated Services Digital Network) circuit switched digital data services, for instance, transfer rates of at least 64 kbit/s would be required. Data services of a public switched telephone network PSTN, such as modems and telefax terminals of the class G3 require higher transfer rates, such as 14.4 kbit/s. An expanding area of mobile data transmission requiring higher data transfer rates than 9.6 kbit/s are mobile video services. The minimum data transfer rate in video transmission can be e.g. 16 or 31 kbit/s.

The transfer rates of the present mobile communications networks are not sufficient, however, for meeting these new demands.

For increasing the data transfer rate, various methods have been studied in connection with the development work carried out at ETSI (European Telecommunications Standard Institute). These methods are herein generally referred to as HSCSD (High Speed Circuit Switched Data). Suggestions have been made e.g. for changing the frame structure. It is a complicated way, however, since it would require changes in the present GSM system. Another suggested way of increasing the data transfer rate is to employ more than one pair of channels, that is, several TDMA time-slots from each frame for one mobile station. A high-speed data signal is distributed at the transmitting end into parallel channels mentioned above for transmitting them over the radio path, and it is combined again at the receiving end. It is thus possible to offer data transmission services having a data transfer rate which is up to eight-fold as compared with the standard data transfer rate, depending on the number of the allocated traffic channels. This is termed as a multi-slot access technique. It is characterized in that there is an equal number of time-slots available both in the transmitting direction and in the receiving direction, i.e. it is symmetric and provides an identical transmission capacity in both directions. In this respect it is similar to connections of a fixed network, which are usually symmetric in both directions.

The symmetric HSCSD method employing several time-slots is attended by a few drawbacks, however. An arrangement, for instance, in which two successive time-slots, e.g. time-slots 2 and 3, would be used for transmission and reception would be extremely difficult to implement in practice, since the problem caused by an arrangement of this kind is the fact that there would be only one time-slot between reception and transmission, that is, a time of some 557 microseconds. When taking into account that the timing advance required for the transmission shortens this time, the actual minimum time required between transmission and reception is only some 340 micro-seconds, considering the maximum correction of the propagation delay used. This is an extremely critical time for a synthesizer to carry out a 45-MHz frequency hop and settle onto a new frequency. This is possible, however, provided that a method suggested in the patent application No. FI-294 2082 filed by the applicant on Dec. 15th, 1994, is used (the application is not public on the filing date of the present application). If, again, e.g. time-slots 3 and 4 would be employed in the downlink direction, and time-slots 4 and 5 in the uplink direction, the time between transmission and reception of the mobile station would be reduced down to two time-slots, during which the radio parts of the mobile station should carry out two major frequency hops: a fast hop from transmission to monitoring, and a hop from monitoring to reception. This is very difficult to implement. In addition, the difference between the time-slots does not comply with the present standards, which would cause problems in the network when allocating time-slots for other traffic.

If there are three or more pairs of channels, one set of radio parts is no longer sufficient for a mobile station. In the case of three pairs of channels, e.g. time-slots 2,3, and 4, transmission would start immediately after reception, and, considering the timing advance required for transmission, transmission would in practice start before the end of reception. If there are three or more time-slots, the mobile station would have to transmit and receive simultaneously, which would naturally require two sets of radio parts. Furthermore, when the number of time-slots exceeded four, there would be no more time for monitoring the adjacent cells with one set of radio parts, which would result in the fact that there would be no information on the adjacent cells available during data transmission. This information is required for handover.

The object of the present information is a high-speed data transmission method having none of the drawbacks of the prior art HSCSD method.

An object of the invention is to achieve a simple structure which would require only minor changes in the present network and enable the use of a mobile station whose structure would be simpler than that of a mobile station capable of symmetric HSCSD transmission, in which case a smaller number of synthesizers and, only one radio part would be required.

Another object is a channel arrangement that would save both the traffic channel capacity of the radio path as compared with the present situation, and the transmission capacity of the fixed part of the network.

Another object is to reduce the interferences caused by the data transmission both at the base station and in the mobile station.

Yet another object is a method that loads particularly the transmitter of the mobile station as little as possible, and consumes less energy.

The above objects are achieved with a method in accordance with the invention, which is characterized in what is claimed in claim 1.

The invention is based on the idea that high-speed data transmission in a cellular network environment is likely to be strongly unidirectional, that is, the data stream mainly takes place in one direction, and during a connection, there is not much need for transmitting data in the opposite direction. In practice, the need to receive data is probably stronger than the need to transmit, as a result of which a larger capacity is needed in the downlink direction. In accordance with the invention, the connection may be adapted to this fact so that the connection is asymmetric, providing a large transmitting capacity in the direction in which the most of the data stream is passing, whereas the transmitting capacity is smaller in the opposite direction. The transmission and reception time-slots are advantageously arranged asymmetrically so that there is no or just a little transmission and reception taking place simultaneously, in which case simpler radio parts are sufficient in the mobile station as compared with the case in which the advantageous arrangement would not be carried out.

During the establishment of a high-speed data connection, the mobile station communicates to the network its demands concerning the data transfer rate. These demands may include the following parameters: the maximum capacity in reception and transmission, the desired grade of service and the required grade of service. The maximum capacity indicates how many time-slots in the transmitting and receiving direction at the most the mobile station is able to handle. The desired grade of service determines the data transfer rate kbit/s the mobile station wishes to use particularly for the connection in question. The desired data transfer rate is also the maximum data transfer rate that may be allowed the mobile station for this connection. By means of this parameter the mobile subscriber can e.g. choose for each call the data transmission service which is currently the most feasible in terms of speed and costs. The required grade of service determines the minimum rate that must be provided for ensuring the continuity of data transmission. In indicating the capacity, the suggestion made in the field may also be made use of, according to which the mobile stations are divided into classes so that the first class is determined by the fact how many transmission time-slots a mobile station is able to use, the second class is determined by the fact how many reception time-slots a mobile station is able to use, and the third class is determined by the maximum value for the sum of the transmission time-slots and the reception time-slots of the mobile station.

The above-mentioned parameters allow the mobile communications network to change the data transfer rates of individual mobile stations in accordance with the needs and the traffic load of the network within the limits set by the parameters without causing any inconvenience to the users. In particular, the network is able to reduce the data transfer rate if the new cell is not able to provide the desired data transfer rate in connection with handover.

On the basis of these parameters the network calculates an appropriate time-slot configuration. It is possible that the network is not able to provide as fast a connection as would be wished by the mobile station at that particular moment. In such a case, a slower connection is accepted, but, if transmission resources are released during the connection, the rate can be changed.

In accordance with the method of the invention, a symmetric connection having a specific number of channel pairs is allocated first in the same way as in the prior art HSCSD method. Thereafter the mobile station establishes an asymmetric connection by employing only those transmission and reception time-slots it needs at that moment. The unused time-slots are not released, however, but they are kept allocated for the duration of the entire data transmission although no bursts are not necessarily transmitted in them.

If an asymmetric connection is a high-speed connection employing a large number of time-slots in the main direction of transmission, a mobile station with simple radio parts is not sufficiently fast for carrying out sufficient monitoring of adjacent channels required by the GSM specification. In such a case, the mobile station may inform the network of its reduced measurement activity. It is also possible that the network concludes from the measurement reports it has received, either on the basis of their content and/or the lowered frequency of arrival, that the measurement activity has decreased. In both cases, the network may take into account the reduced measurement capacity upon preparing for the handover.

Figure 2:
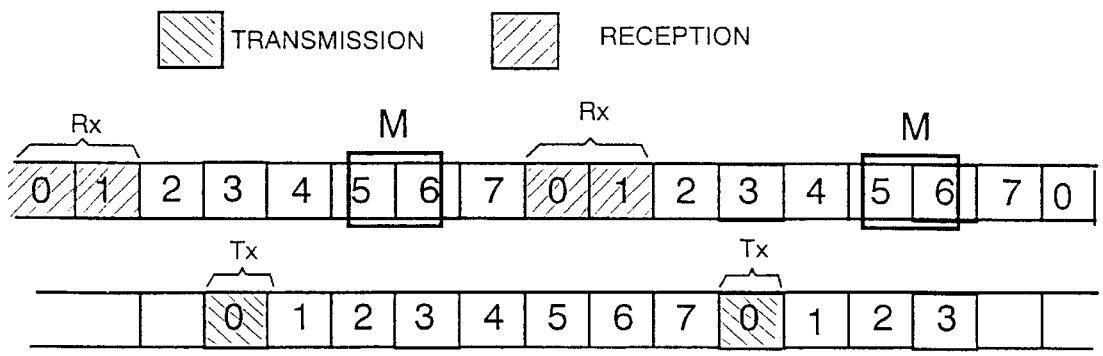
Figure 3:
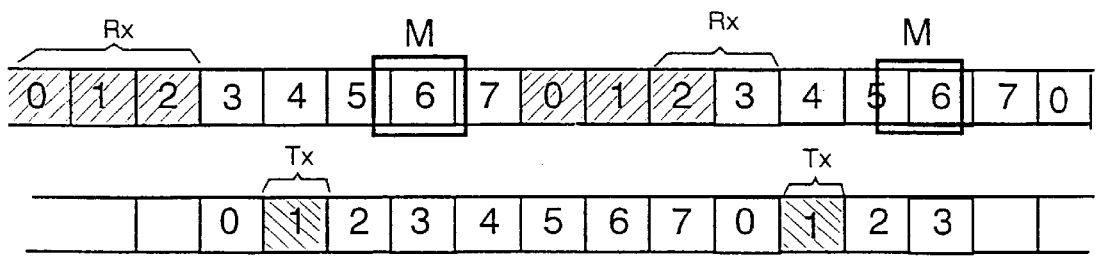
Figure 4:
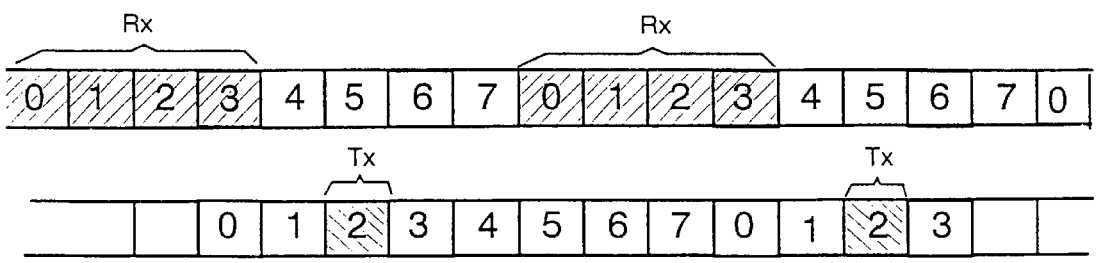

In the following, the invention will be described in closer detail by means of a preferred embodiment with reference to the attached Figures, in which FIGS. 1A–1E show the use of the time-slots of a mobile station, FIG. 2 shows asymmetric transmission when the structure 2+1 is applied, FIG. 3 shows asymmetric transmission when the structure 3+1 is applied, FIG. 4 shows asymmetric transmission when the structure 4+1 is applied, whereby the monitoring has been reduced, and FIGS. 5 and 6 show establishing asymmetric transmission starting from symmetric transmission, and FIGS. 7 and 8 show different control channel alternatives.

It must be noted that the cases of asymmetry shown in the attached figures are only shown by way of example, and they do not limit the degree and direction of asymmetry to those shown in the figures.

FIG. 2 shows a case of asymmetric data transmission in which a mobile station is receiving in two time-slots and transmitting in one time-slot. In this figure, like in the subsequent figures, the upper time-slots illustrate the time-slots of the reception frame of the mobile station, and the lower time-slots illustrate the time-slots of the transmission frame. The time-slots of the reception frame are time-slots of the downlink direction of the serving base station. For the sake of convenience, the mobile station is assumed to be near the base station, and the timing advance is thus not marked in the figure. Disregarding the timing advance in the figures does not, however, have any effect on implementing the invention. When referring to the downlink and uplink time-slots in the text, denotation m+n is used when necessary, wherein m refers to the time-slots in the downlink direction, and n correspondingly to the uplink time-slots. E.g. when referring to a mobile station, 4+2 denotes that reception is carried out in four time-slots and transmission in two time-slots.

In the example shown in FIG. 2, the base station is transmitting in time-slots 0 and 1, and the mobile station is transmitting in time-slot 0. It was stated above that the transmission of the mobile station is arranged to take place three burst periods later than the reception, whereby the time-slots having the same number form a traffic channel. In the case shown in FIG. 2, the first reception time-slot 0 and the transmission time-slot 0 form a pair, but there is no corresponding transmission time-slot 1 for reception time-slot 1. As a result, the mobile station is able to receive data from the network with a speed double the speed of a prior art traffic channel comprising one time-slot, but, since there is only one transmission time-slot, there is time for the mobile station to carry out monitoring of the adjacent base stations during the frame. This is marked with M. This asymmetric use of time-slots enables the use of a conventional mobile telephone having one set of radio parts for receiving high-speed data, and maintaining full mobility, as sufficient measurement data is obtained from the adjacent base stations.

The described time-slot structure can also naturally be applied to the opposite symmetry, that is, the mobile station transmits data in two time-slots and receives data in one time-slot only.

FIG. 3 shows an asymmetric case in which a mobile station is receiving in three time-slots and transmitting in one time-slot. In the figure, the reception time-slots are 0, 1 and 2, and the transmission time-slot is 1. If the transmission time-slot were the counterpart of the first reception time-slot, it would be time-slot 0. Regarding the timing advance, the symmetric transmission would start before the end of reception in time-slot 2, which would require a second set of radio parts for generating the frequencies. This is avoided so that the transmission time-slot is 1, in which case the frequency synthesizer has a time of almost one time-slot to tune in onto the transmission frequency. After transmission, there is still a time corresponding to three time-slots for carrying out frequency monitoring of the adjacent base stations. In the case of asymmetry shown in the figure, the mobile station is able to receive data from the network at the speed three times faster as compared with a prior art traffic channel comprising one time-slot, but, since there is only one transmission time-slot, and it corresponds to the middle reception time-slot, the mobile station has sufficient time to carry out the required monitoring of the adjacent channels during the frame. This is marked with M. This asymmetric use of time-slots enables the use of a conventional mobile telephone having one set of radio parts for receiving high-speed data, and maintaining full mobility.

The time-slot structure 3+1 shown in FIG. 3 can naturally also be applied to the opposite symmetry, i.e. the mobile station can transmit data in three time-slots and receive data in one time-slot only.

Asymmetry cannot be increased more than shown in FIG. 3 if monitoring of the adjacent channels in every frame, that is, full mobility of the mobile station is also wished to be ensured. If monitoring activity is reduced, asymmetry may be increased further, yet maintaining the present mobile station equipment comprising only one converter. If monitoring were entirely omitted, it would be possible to employ as many as five time-slots, whereby no time would be left for monitoring if the mobile station only had one set of radio parts. In such a case, high-speed data transmission can be maintained only as long as the mobile station remains within the coverage area of its service cell, where the field strength of the reception signal is sufficiently high. Upon approaching the boundary area of the cells, the field strength becomes weaker, and the connection would break up, as the measurement results required for handover are lacking. The latest measurement results the network has are the results reported by the mobile station in the idle state before establishing the data connection, and the radio environment is not known to the network at the moment handover is required. It is possible to employ five time-slots, and thus the maximum data transfer rate provided that the measurements are carried out during the idle frame of the multiframe.

As is well known, on a full-rate traffic channel in the GSM system a 26 frame multiframe consists of 24 traffic channel frames (TCH frame), one slow control channel frame (SACCH frame) during which the mobile station transmits a measurement report, and one idle frame. When a time-slot of a SACCH frame is used only for transmitting the measurement report, the report is updated in the present GSM system at every 480 ms, that is, about twice every second. The GSM specification enables monitoring measurements also during the idle frame. If the measurements are carried out only then, i.e. only once during a 120-ms multiframe, it is possible to measure the BCCH carrier wave of one or more adjacent base stations.

Measuring a sufficient number of carrier waves of the adjacent base stations requires so much time that updating the results is slowed down as compared with the normal situation. This also means that the mobility of the mobile station is reduced. In accordance with the present invention, measurements may also be carried out during a SACCH frame which has been allocated in accordance with the second embodiment, but which is unused. This improves the situation compared with the case in which measurements are only carried out during an idle frame.

In accordance with FIG. 4, four time-slots are used for receiving data, that is, time-slots 0–3, and only one time-slot, i.e. time-slot 2 is used for transmission. Time-slot 2 is the counterpart of the last reception time-slot but one. The asymmetry is thus 4+1. There are only two time-slots between transmission and reception, so that a mobile telephone having a single set of radio parts has no time for monitoring measurements, but they are carried out during the idle frame. The mobile station can inform the network of its reduced measurement activity by setting an appropriate indicator to the measurement report. The network may also conclude on the basis of the content or the decreased amount of the measurement reports that the measurement activity has reduced.

Correspondingly, time-slots 0–4 may be used for reception, and time-slot 3 for transmission, in which case the asymmetry is 5+1. When the amount of monitoring is reduced, it is still possible to employ a simple mobile station having one set of radio parts.

The asymmetry 4+1 and 5+1 may naturally also be applied in the opposite direction, in other words, the mobile station can transmit data in four or five time-slots and receive data in one time-slot only.

The above description discloses the principle of symmetric data transmission. No attention has been paid to the fact how the time-slots to be used are formed. They can be formed at least in two ways. The mobile station has informed the network at the beginning of the connection at the latest what are its abilities, wishes and requirements in the transmitting and receiving direction. As regards the wishes, the mobile station may provide parameters "the desired grade of service" and "the required grade of service". The desired grade of service determines the data transfer rate kbit/s the mobile station wishes to use for this particular connection. The required grade of service determines the minimum speed that must be provided for ensuring a continuous data transmission. In addition, the mobile station may provide the network with information on its reduced measurement capacity, provided that the desired grade of service is such that no time is allowed for the monitoring measurements in accordance with the GSM specification. If the mobile stations are divided into different classes on the basis of their capacity as suggested in the field, the network is informed of the capacity in a message transmitted by the mobile station, the message containing a class indicator.

The network calculates how many symmetric channels can be allocated in the transmitting and receiving direction when regarding its current capacity and the capacity of the mobile station. Thereafter, it provides a specific asymmetric time-slot configuration, reports it to the mobile station, whereafter data transmission takes place. The time-slot configuration may change during the connection if necessary.

The application program of a device, such as a PC connected to the mobile station may automatically provide the mobile station with the information on the required uplink and downlink time-slots or the data transfer rate. They can be included in a Call_Set_Up message. In an Assignment_Command message the network may communicate the allocated time-slots to the mobile station. This message may contain separate descriptions of the uplink and downlink channels. Correspondingly, a Handover_Command message transmitted in a handover can separately provide the uplink and downlink channels.

In accordance with the embodiment shown in FIGS. 5 and 6, a prior art symmetric HSCSD method is applied. In accordance with the method, the number of symmetric channel pairs calculated by the network is first allocated, FIG. 5 (channel pairs 1, 2 and 3 in this example). The mobile station does not have to, or it is not able to use more than one time-slot in the transmitting direction. It thus leaves time-slots 1 and 3 unused and transmits data only in time-slot 2. The network does not need to be aware of the action of the mobile station, as if it does not receive data from the unused time-slots 1 and 3 of the mobile station, it will not react in any way, but assumes that there has not been anything to transmit. In such a case, the action resembles a case of prior art DTX (Discontinuous Transmission). If four or five pairs of channels have been allocated, the mobile station will leave a desired number of time-slots in the opposite direction unused, and additionally carries out monitoring with a reduced activity, as shown in the explanation of FIG. 4. If the telephone has effective radio parts, it may naturally carry out monitoring simultaneously with transmitting or receiving data.

The network advantageously first allocates the symmetric pairs of channels, whereafter the mobile telephone and the network may negotiate on the asymmetric transmission required by the mobile telephone, and the network will then set the suitable time-slots.

The measurement results are mainly transmitted on a SACCH channel associated with data transmission, that is, the same channel that is used for transmitting data is also used for transmitting the measurement reports. The network has given an order at which time-slot it expects to receive measurement reports. There may be one or more SACCH channels. It may also have indicated which time-slots are used for transmitting data. It is possible that when two or more time-slots have been allocated symmetrically, the mobile station may use one time-slot for transmitting measurement results only. E.g. in the case of FIG. 6 the mobile station receives high-speed data in reception time-slots 1, 2, and 3. In the transmitting direction it does not employ time-slot 1 at all, it transmits data in time-slot 2, and the measurement results in the SACCH channel associated with time-slot 2. It is also possible that the mobile station uses all the symmetric time-slots allocated to it for transmission, but only one or a few time-slots are sufficient for reception, i.e. transmission of the base station. In such a case, the network will tell the mobile station at which time-slot to transmit.

Practically in all cases of asymmetric data transmission a slow control channel SACCH and a fast connection-specific control channel FACCH are allocated to one pair of time-slots only. As is well known, the FACCH channel is formed of the traffic channel so that a few traffic channel time-slots are "borrowed" for transmitting control information to the mobile station. Therefore, in the present GSM system there must be at least one time-slot having the same time-slot number both in the transmitting direction and in the receiving direction. It is not necessary, however, that the first time-slot in the direction in which there are less time-slots should be the counterpart of the first time-slot in the opposite direction. Thus, e.g. in FIG. 4 the counterpart of transmission time-slot 2 is only the third reception time-slot.

For transmitting control information, the control channels can be arranged in a variety of ways. If there are more time-slots available in the downlink direction than in the uplink direction, it is possible that all the downlink time-slots are used for transmitting control information, whereas in the uplink direction, control information is transmitted e.g. in one time-slot only. In such a case, one uplink time-slot forms control channel pairs with several downlink time-slots. The idea is illustrated by means of FIGS. 7 and 8.

In FIG. 7, time-slots 1, 2, 3 and 4 are available in the downlink -direction, and time-slots marked with letters a and b are available in the uplink direction. Control information is transmitted in all downlink time-slots, but in the uplink direction, control information related to the downlink time-slots 1 and 2 is only transmitted in time-slot a, and correspondingly, control information related to the downlink time-slots 3 and 4 is only transmitted in time-slot b. Thus, the first group of traffic channel pairs is composed of time-slots (1, a) and (2, a) and the second group of channel pairs is composed of time-slots (3, b) and (4, b).

In FIG. 8, control information is transmitted in time-slots 1, 2 and 3 in the downlink direction, but, in the uplink direction, all control information is transmitted in time-slot a only. Three pairs of control channels are thus formed, namely time-slot pairs (1, a), (2, a) and (3, a).

The disclosed asymmetric high-speed data transmission enables saving the batteries of the mobile station, since in most cases the data stream is directed towards the mobile station, and its need for transmission is only minor, and the transmitter having a high power consumption is turned on only occasionally. In the case of the second embodiment, the problem is that part of the time-slots allocated to the mobile station remain unused, but on the other hand, it provides the advantage that the interference of the same frequency channel is reduced in another mobile station or in a base station, depending on the direction of the asymmetry.

The above explanation and the figures associated therewith are only intended to illustrate the present invention. Different variations and modifications of the invention will be obvious to persons skilled in the art, without deviating from the scope and the spirit of the invention set forth in the attached claims.

What is claimed is:

1. A method for high-speed data transmission between a mobile station and a mobile communications network in a mobile communications system based on time division multiple access (TDMA), said method comprising:

using for a transmitting direction a frequency different from a frequency used for a receiving direction;

allocating for the data transmission at least two time slots in at least one of the transmitting and the receiving direction;

employing time-slots asymmetrically so that in the transmitting direction and in the receiving direction, a number of the time-slots corresponds to a currently required data transmission rate in each respective direction;

further keeping allocated ones of the time-slots that are not used for data transmission; and selecting ones of the time-slots used for the data transmission in each direction such that even at a maximum timing advance the mobile station does not have to send and receive simultaneously with one set of radio parts.

2. A method as claimed in claim 1, wherein the number of the time-slots used for the transmitting direction and the receiving direction are allocated asymmetrically directly, at call establishment time.

3. A method as claimed in claim 1, wherein the number of the time-slots used for the transmitting direction and the receiving direction are allocated symmetrically at call establishment times and the allocated time-slots are used asymmetrically.

4. A method as claimed in claim 1, wherein a number of the allocated time-slots can be changed during a data connection.

5. A method as claimed in claim 1, wherein a number of the used time-slots can be changed during a data connection.

6. A method as claimed in claim 1, wherein the mobile station and the mobile communications network negotiate which of the time-slots are used for the data transmission.

7. A method as claimed in claim 1, wherein the mobile station informs the mobile communications network of at least one of a maximum number of transmission time-slots and reception time-slots the mobile station is able to use and a data transfer rate the mobile station wishes to have for the data connection.

8. A method as claimed in claim 1, wherein the mobile station informs the mobile communications network of a number of transmission and reception time-slots the mobile station is able to use at most by means of a maximum value of a sum of the number of the transmission time-slots and the reception time-slots, wherein the transmission time-slots and the reception time-slots used for the data transmission are chosen, so that the sum of the numbers of the time-slots is not higher than the maximum value given by the mobile station.

9. A method as claimed in claim 1, wherein the mobile station monitors neighboring base stations during the data transmission.

10. A method as claimed in claim 1, wherein at least one downlink time-slot and one uplink time-slot form a pair of transmission channels to transmit control information, wherein one channel of the pair of transmission channels is a slow associated control channel (SACCH) in accordance with a GSM system.

11. A method as claimed in claim 10, wherein at least one time-slot in at least one of the transmitting and the receiving direction has at least two counterparts in an opposite direction, wherein two pairs of transmission channels are formed.

12. A method as claimed in claim 10, wherein each time-slot has, in a direction in which fewer time-slots are used, a counterpart in a direction in which more time-slots are used.

13. A method as claimed in claim 11, wherein at least one time-slot has, in a direction in which fewer time-slots are used, at least two counterparts in a direction in which more time-slots are used, wherein at least two pairs of transmission channels are formed, having one time-slot in common.

14. A method as claimed in claim 10, wherein the mobile station uses the control channel (SACCH) to transmit results of monitoring measurements of adjacent channels the mobile station has carried out.

15. A method as claimed in claim 1, wherein the mobile station carries out monitoring measurements during a control channel frame of a transmission channel used for data transmission during a period in which no measurement results are transmitted, said control channel frame being a slow control channel frame (SACCH) in accordance with a GSM system.

16. A method as claimed in claim 15, wherein the mobile station informs the mobile communications network of the mobile station's reduced monitoring measurement activity.

17. A method as claimed in claim 15, wherein the mobile communications network concludes based on measurement results the mobile communications network has received that monitoring measurement activity of the mobile station has been reduced.

18. A method as claimed in claim 1, wherein a first transmission time-slot is not a counterpart of a first reception time-slot.

19. A method as claimed in claim 1, wherein in order to avoid simultaneous transmission in the data transmission between a last transmission time-slot and a first reception time-slot used by the mobile station, there is at least one time-slot, and wherein to further avoid simultaneous transmission in the data transmission between the last reception time-slot and the first transmission time-slot used by the mobile station, there is at least one time-slot from which a timing advance is subtracted.

20. A method as claimed in claim 1, wherein at least one mobile station comprises two sets of radio parts.

21. A mobile communications system for use in a high-speed data transmission between a mobile station and a mobile communications network in the mobile communications system based on time division multiple access (TDMA), said mobile communications system arranged to use a different frequency for a transmitting direction and a receiving direction, said mobile communications system comprising:
- a time-slot allocating mechanism arranged to allocate at least two time slots in at least one of the transmitting and the receiving direction for data transmission;
- a time-slot employing mechanism arranged to employ time-slots asymmetrically so that in the transmitting direction and in the receiving direction a number of the time-slots corresponds to a currently required data transmission rate in each respective direction, said time-slot employing mechanism further arranged to keep allocated ones of the time-slots that are not used for the data transmission; and
- a time-slot selecting mechanism arranged to select ones of the time-slots used for the data transmission in each direction such that even at a maximum timing advance the mobile station does not have to send and receive simultaneously with one set of radio parts.

22. A mobile communications system as claimed in claim 21, wherein the number of the time-slots used for the transmitting direction and the receiving direction is to be allocated asymmetrically directly, at call establishment time.

23. A mobile communications system as claimed in claim 21, wherein the number of the time-slots used for the transmitting direction and the receiving direction is to be allocated symmetrically at call establishment time, and the allocated time-slots are to be used asymmetrically.

24. A mobile communications system as claimed in claim 21, wherein a number of the allocated time-slots can be changed during a data connection.

25. A mobile communications system as claimed in claim 21, wherein a number of the used time-slots can be changed during a data connection.

26. A mobile communications system as claimed in claim 21, wherein the mobile station and the mobile communications network are arranged to negotiate which of the time-slots are to be used for the data transmission.

27. A mobile communications system as claimed in claim 21, wherein the mobile station is arranged to inform the mobile communications network of at least one of a maximum number of transmission time-slots and reception time-slots the mobile station is able to use and at which data transfer rate the mobile station wishes to have for a data connection.

28. A mobile communications system as claimed in claim 21, wherein the mobile station is arranged to inform the mobile communications network of a number of transmission and reception time-slots the mobile station is able to use at most by means of a maximum value of a sum of the number of the transmission time-slots and the reception time-slots, wherein the transmission time-slots and the reception time-slots to be used for the data transmission are to be chosen, so that the sum of the number of the time-slots is not higher than the maximum value to be given by the mobile station.

29. A mobile communications system as claimed in claim 21, wherein the mobile station is arranged to monitor neighboring base stations during the data transmission.

30. A mobile communications system as claimed in claim 21, wherein at least one downlink time-slot and one uplink time-slot are arranged to form a pair of transmission channels to transmit control information, wherein one channel of the pair of transmission channels is a slow associated control channel (SACCH) in accordance with a GSM system.

31. A mobile communications system as claimed in claim 30, wherein at least one time-slot in at least one of the transmitting and the receiving direction has at least two counterparts in an opposite direction, wherein two pairs of transmission channels are to be formed.

32. A mobile communications system as claimed in claim 30, wherein each time-slot has, in a direction in which fewer time-slots are to be used, a counterpart in a direction in which more time-slots are to be used.

33. A mobile communications system as claimed in claim 31, wherein at least one time-slot has, in a direction in which fewer time-slots are to be used, at least two counterparts in a direction in which more time-slots are to be used, wherein at least two pairs of transmission channels are to be formed, having one time-slot in common.

34. A mobile communications system as claimed in claim 30, wherein the mobile station is arranged to use the control channel (SACCH) to transmit results of monitoring measurements of adjacent channels the mobile station has carried out.

35. A mobile communications system as claimed in claim 21, wherein the mobile station is arranged to carry out monitoring measurements in a control channel frame of a transmission channel used for data transmission during a period in which no measurement results are to be transmitted, said control channel frame being a slow control channel frame (SACCH) in accordance with a GSM system.

36. A mobile communications system as claimed in claim 35, wherein the mobile station is arranged to inform the mobile communications network of the mobile station's reduced monitoring measurement activity.

37. A mobile communications system as claimed in claim 35, wherein the mobile communications network is arranged to conclude based on measurement results the mobile communications network has received that monitoring measurement activity of the mobile station has been reduced.

38. A mobile communications system as claimed in claim 21, wherein a first transmission time-slot is not a counterpart of a first reception time-slot.

39. A mobile communications system as claimed in claim 21, wherein in order to avoid simultaneous transmission in the data transmission between a last transmission time-slot and a first reception time-slot to be used by the mobile station, there is at least one time-slot, and wherein to further avoid simultaneous transmission in the data transmission between the last reception time-slot and the first transmission time-slot to be used by the mobile station, there is at least one time-slot from which a timing advance is to be subtracted.

40. A mobile communications system as claimed in claim 21, wherein at least one mobile station is arranged to comprise two sets of radio parts.

* * * * *